3,397,949
SODIUM TRIPOLYPHOSPHATE
Edward J. Griffith, Manchester, Mo., assignor to Monsanto Company, St. Louis, Mo., a corporation of Delaware
No Drawing. Filed Mar. 29, 1966, Ser. No. 538,195
15 Claims. (Cl. 23—106)

This invention relates to methods for preparing anhydrous sodium tripolyphosphate. More particularly, it relates to methods for preparing anhydrous sodium tripolyphosphate from hydrated sodium tripolyphosphate without excessive degradation.

Crystalline sodium tripolyphosphate hexahydrate cannot be dehydrated to anhydrous sodium tripolyphosphate under normal processing conditions without degradation to the mixture of sodium orthophosphate and sodium pyrophosphate which are not as effective as sodium tripolyphosphate in many uses such as detergent building. In some processes, a sodium tripolyphosphate hexahydrate is produced and it would be advantageous to convert the hexahydrate to the anhydrous form without excessive degradation.

Methods heretofore known for the dehydration of sodium tripolyphosphate have resulted in either excessive degradation, use of an expensive solvent, and/or extremely close control of operating conditions. It is believed, therefore, a process which would enable the dehydration of sodium tripolyphosphate hexahydrate without excessive degradation and which does not employ an expensive solvent and does not require extremely close operating control would be a significant advancement in the art.

In accordance with this invention, it has been discovered that by conducting the dehydration of sodium tripolyphosphate hexahydrate in the presence of an effective amount of one or more members of a class of compounds which have been found to act as degradation inhibitors, degradation of the sodium tripolyphosphate can be greatly reduced.

The undesirable characteristic of the sodium tripolyphosphate hexahydrate to degrade when dehydrated under most processing conditions has long confounded researchers who have studied the behavoir of sodium tripolyphosphate. The degradation of sodium tripolyphosphate hexahydrate during the dehydration is not the simple hydrolysis reaction that occurs when sodium tripolyphosphate degrades an equeous solution under high temperature and pH conditions. This is illustrated by the fact that the degradation products from a simple hydrolysis reaction are in a 1:1 molar ratio of orthophosphate to pyrophosphate. As is previously known and is shown in detail herein, the degradation products from the normal dehydration of sodium tripolyphosphate hexahydrate vary considerably and in most cases show a predominance of tetrasodium pyrophosphate.

It has been found that the degradation inhibitors useful in this invention protect the sodium tripolyphosphate hexahydrate from degrading under conditions which normally would cause severe degradation of the tripolyphosphate anion. It has also been found that sodium tripolyphosphate hexahydrate is effectively protected from degradation during dehydration with relatively minor amounts of the degradation inhibitor.

In general, the degradation inhibitors which have been found to have suitable properties for practicing this invention are the nitrogenous compounds containing guanidino, ureido and thioureido radicals, that is, those containing at least one

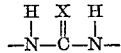

radical wherein X is selected from the group consisting of sulfur, oxygen, and NH. The acyclic compounds as well as the cyclic compounds containing the guanidino, ureido and thioureido radicals are useful in the practice of this invention. The acyclic compounds which are useful in the practice of this invention are represented by the formula

  Formula 1 wherein $R_4$ is selected from the group consisting of hydrogen and lower alkyl,

and

and X is selected from the group consisting of oxygen, sulfur and NH, and $R_3$ is selected from the group consisting of hydrogen and lower alkyl, that is containing from 1 to 4 carbon atoms.

Compounds illustrative of useful acyclic nitrogenous compounds containing the guanidino radical include guanidine; biguanidine; carbamylguanidine; guanylhydrazine; 1-methyl-guanidine; 1,3-methyl-guanidine; 1-tert-butylguanidine; 1-methyl-3-(3-ethyl thiourea) guanidine; 1-ethyl-3-(3-methyl urea) guanidine; and 1-methyl-3-acetyl-guanidine.

Compounds illustrative of those acyclic compounds useful in the practice of this invention containing uredido radicals include urea; biurea; dicyandiamine; methyl urea; ethyl urea; 1,3-diethyl urea; acetyl biuret; 1,5-diamino-biuret; 1-acetyl urea; 1-acetyl-3-methyl urea; 1-tert-butyl-urea; 1-butylurea; 1,3-dimethyl urea; 1-ethylurea; isobutylurea; 1-propylurea; 1,3-diacetyl urea; and 1-(3-methylbutyl) urea; and isobutylurea.

Compounds illustrative of the acyclic compounds useful in the practice of this invention containing thioureido radicals include thiourea; 1-methyl-2-thiourea; 1-acetyl-2-thiourea; 1,3-diethyl-2-thiourea; 1,3-dimethyl-2-thiourea; 1,3-dipropyl-2-thiourea; 1,3-diisopropyl-2-thiourea; 1-methyl-2-thiourea; 1,3-dipropyl-2-thiourea and 1,3-diisopropyl-2-thiourea.

The cyclic compounds which have been found useful in the practice of this invention are those represented by the formula

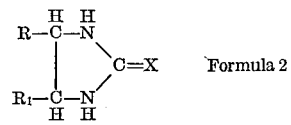  Formula 2 wherein X and R and $R_1$ are each the same as $R_4$ in Formula 1.

Compounds illustrative of those cyclic compounds containing guanidino, ureido, and thioureido radicals include 2-imidazolidone (ethylene urea); 4-methyldihydro-2-imidazolone; 5-hydroxy-2-tetrahydropyrimidone; 2-imidazolidinethione; 2-imidoimidiazoline; 2-thio-imidiazolidine; 5-methyl-2-oxaimidiazolidine and 4-ethyl-2-oxaimidiazolidine.

Although any of the foregoing classes of compounds can be used, it is preferred in the practice of this invention to use the acyclic compounds wherein $R_1$ is hydrogen. Especially preferred in the practice of this invention are those compounds wherein X is oxygen. Of the especially preferred compounds, urea, because of its relative inexpensiveness and ready availability, is particularly preferred.

Although the invention as described herein as using one of the members of a class of compounds hereinbefore described as degradation inhibitors, under some conditions compounds can be used which will form one or more members of the before-mentioned class under the conditions specified herein for practicing this invention. For example, ammonium cyanate can hydrolyze to form urea therefore can be used in some cases to provide the degradation inhibitor of this invention. It is deemed to be within the scope of this invention when a compound is used which compound under the operative conditions of this invention reacts to form one of the degradation inhibitors specified herein.

The subject invention can be practiced in various ways to achieve the protection of the sodium tripolyphosphate hexahydrate during dehydration, that is, it is useful in protecting the hexahydrate alone or in admixture with other components such as in a detergent heat drying operation. Any amount of degradation inhibitor can be used to obtain a discernible reduction in degradation when sodium tripolyphosphate hexahydrate is dehydrated in the presence of the inhibitor. In many instances, a significant reduction in the degree of degradation can be achieved with the addition of extremely small amounts of the degradation inhibitor, for example, as little as .05% by weight based upon the weight of the sodium tripolyphosphate hexahydrate. It is, however, generally preferred to use at least 0.5% by weight in most instances. Major amounts of the degradation inhibitor can be employed if desired such as 50% or even higher. Additionally, sodium tripolyphosphate hexahydrate can be protected against degradation during dehydration with amounts of degradation inhibitor as large as 10 to 100 times the amount of the sodium tripolyphosphate hexahydrate. It is, however, generally preferred to use from about 1 to about 8 weight percent based upon the sodium tripolyphosphate hexahydrate since the amounts of above about 8 weight percent have not been found to appreciably increase the protection against degradation and therefore needlessly add to the cost of the process of this invention. As can be appreciated, the reasons that the degradation inhibitor effectively protects against degradation cannot be explained as a simple reaction with water since, as will be more specifically shown in the specific examples, an effective amount is less than the molar equivalent of the water present in the hydrate. If a simple reaction were occurring between the water and the degradation inhibitor, amounts greater than 50% by weight would be required to achieve effective inhibiting and as can be seen in the detailed examples following amounts from 1 to 5% by weight effectively reduce the degradation.

In general, temperatures of above 100° C. are used to carry out dehydration of the hexahydrate. Degradation has been found to be more severe in dehydration temperature ranges from about 100° C. to about 175° C. than at higher temperatures; therefore, the benefits of this invention are particularly useful to those who wish to dehydrate in the temperature ranges where degradation is more severe, however, degradation is inhibited even at higher dehydration temperatures such as 200° C. or 300° C. or even higher such as 500° C. Although degradation is not as severe at temperatures about about 175° C., utilization of the degradation inhibitors of this invention reduces the degradation an appreciable amount even at these higher temperatures. Although in most instances the temperature during dehydration will be above 100° C., it has been found that the degradation inhibitors are effective at lower temperatures, that is, below 100° C. such as 80° C. to 60° C. or even lower, which may be employed when dehydration is carried out under vacuum conditions.

Humidity conditions of the atmosphere surrounding the sodium tripolyphosphate hexahydrate during dehydration is not critical and effective inhibiting of degradation is experienced over wide ranges of humidities, that is, from 0.5% to 99% relative humidity. In most instances when air is heated to about 110° C., the preferred operating range, the humidity of the drying air is relatively low. Since dehydration is generally more difficult when the atmosphere surrounding the hydrate is relatively humid and/or when the drying medium such as air is relatively humid, it is preferred to use relatively low humidity conditions, that is, from about 5% to about 45%.

When it is desired to protect sodium tripolyphosphate hexahydrate during dehydration when it is converted to anhydrous sodium tripolyphosphate without the presence of other components, a useful method for applying the degradation inhibitor is to spray an aqueous solution of the degradation inhibitor upon the surfaces of the sodium tripolyphosphate hexahydrate and air dry. During the drying step, the water evaporates leaving the degradation inhibitor deposited on the surface of the crystals of sodium tripolyphosphate hexahydrate thereby affording the maximum protection during the subsequent dehydration of the sodium tripolyphosphate hexahydrate.

In other instances when the dehydration is conducted in the presence of other compounds such as in the heat drying of detergents, it has been found useful to include small amounts (such as from about 0.1% to about 1% by weight based upon the sodium tripolyphosphate hexahydrate) of inorganic polar substances such as the alkaline earth halides. For example, calcium chloride can be added to an aqueous solution of a degradation inhibitor which is applied to the anhydrous sodium tripolyphosphate before it is hydrated in the detergent slurry.

The process of this invention has been found useful in protecting the degradation of sodium tripolyphosphate which normally occurs in the production of an extremely dense granular anhydrous sodium tripolyphosphate. In this process for producing the dense anhydrous sodium tripolyphosphate, a heated stream of anhydrous sodium tripolyphosphate and a partially hydrated stream of sodium tripolyphosphate is mixed together and subsequently mechanically compacted. Since most of the water is driven off during compaction the hexahydrate decomposes. It has been found that a significant reduction in the degradation of the sodium tripolyphosphate occurs when the degradation inhibitor is added to the water which is used to hydrate the stream of partially hydrated sodium tripolyphosphate.

The process of this invention can also be utilized wherein it is desired to only partially dehydrate the sodium tripolyphosphate hexahydrate. The dehydration of the sodium tripolyphosphate hexahydrate, therefore, does not have to be complete to achieve benefits from this invention.

As previously mentioned, this invention is suitable for use in a detergent process wherein anhydrous sodium tripolyphosphate is added as a builder to various surface active agents and a slurry of the active is formed and subsequently dried. During the formation of the slurry the anhydrous sodium tripolyphosphate hydrates and during the detergent drying step some degradation occurs. By adding the degradation inhibitor to the anhydrous sodium tripolyphosphate before it is hydrated, the degradation during the subsequent drying step is reduced.

The practice of this invention in a detergent drying operation is independent of the detergent components which are present when the mixture containing the sodium tripolyphosphate hexahydrate is subjected to the drying operations. Such detergent components can include the various types of soaps and also the synthetic organic detergent components including the anionic, nonionic and amphoteric types.

Anionic synthetic surface active agents are generally described as those compounds which contain hydrophilic and lyophilic groups in their molecular structure and ionize in an aqueous medium to give anions containing both the lyophilic group and hydrophilic group, the alkyl aryl sulfonates, such as sodium dodecylbenzene sulfonate, the alkane sulfates, such as sodium dodecyl sulfate, and the sulfated oxyethylated phenols, such as sodium tetradecyl phenoxy triethyleneoxy sulfate, are illustrative of the well-known class of anionic type of surface active compounds.

Nonionic surface active compounds can be broadly described as compounds which do not ionize but acquire hydrophilic characteristics from an oxygenated side chain such as polyoxyethylene and the lyophilic part of the molecule may come from fatty acids, phenol, alcohols, amides or amines. The compounds are usually made by reacting an alkylene oxide such as ethylene oxide, butylene oxide, propylene oxide and the like with fatty acids, the straight or branched chain alcohols, phenols, thiophenols, amides, and amines to form polyoxyalkylene glycol ethers and esters, polyoxyalkylene alkyl phenol and polyoxyalkylene thiophenols, and polyoxyalkylene amides and the like. It is generally preferred to react from about 3 to about 30 mols of alkylene oxide per mol of the fatty acids, alcohols, phenols, thiophenols, amides or amines. Illustrative of the surface active agents include the products obtained from condensing ethylene oxide with the following: propylene glycol, ethylene diamine, diethylene glycol, dodecyl phenol, nonyl phenol, and the like.

Amphoteric surface active compounds can be broadly described as compounds which have both an anionic and cationic group in their structure. Illustrative of the amphoteric surface active agents are the amido alkane sulfonates, such as sodium C-tridecyl, N-methyl, amido ethyl sulfonate.

Other individual compounds which are illustrative of the foregoing classes of surface active agents are well known in the art and can be found in standard detergent reference materials such as Surface Active Agents, Swartz and Perry, Interscience Publishers Inc., New York, N.Y. (1949).

The following examples illustrate specific embodiments of the present invention; all parts, percentages and proportions are by weight unless otherwise indicated.

EXAMPLE 1

Four samples containing about 100 parts of sodium tripolyphosphate hexahydrate are each coated with urea by slurrying the samples of sodium tripolyphosphate hexahydrate in 50 parts of water to which 1, 2, 3, and 5 parts of urea have been added. After being air dried to remove the water, the urea coated samples are dehydrated and compared to a sample of sodium tripolyphosphate hexahydrate which has not been treated with urea.

The following procedure is used to dehydrate each of the sodium tripolyphosphate hexahydrate samples. Air which has a relative low humidity (about 31% at about 25° C.) is heated to about 150° C. and pumped over the samples. Each sample is dried for about 15 hours under the foregoing controlled conditions and the weight loss shows all the water of hydration is removed. After dehydration the samples are cooled and analyzed by ion exchange chromatography. Results of the analysis are given in the following table.

TABLE I

| Sample | Urea Content (weight percent) | Phosphate Analysis After Drying | | | |
|---|---|---|---|---|---|
| | | Tripoly-phosphate | Trimeta-phosphate | Pyro-phosphate | Ortho-phosphate |
| 1 | 0 | 67.18 | 0.27 | 30.66 | 1.89 |
| 2 | 1 | 92.48 | 0.25 | 5.05 | 2.22 |
| 3 | 2 | 92.52 | 0.24 | 4.76 | 2.47 |
| 4 | 3 | 88.77 | 0.29 | 7.92 | 3.02 |
| 5 | 5 | 93.29 | 0.57 | 3.60 | 2.54 |

EXAMPLE 2

Following essentially the same procedure as in Example 1, except the air is heated to about 125° C., four urea coated samples (prepared as in Example 1) are compared with a sample of sodium tripolyphosphate hexahydrate without urea. The samples are dehydrated as in Example 1. Results of ion exchange chromatography analysis of the samples are given in the following table.

TABLE II

| Sample | Urea Content (weight percent) | Phosphate Analysis After Drying | | | |
|---|---|---|---|---|---|
| | | Tripoly-phosphate | Trimeta-phosphate | Pyro-phosphate | Ortho-phosphate |
| 1 | 0 | 11.93 | 0.23 | 78.58 | 9.26 |
| 2 | 1 | 81.38 | 0.32 | 15.53 | 2.77 |
| 3 | 2 | 86.80 | 0.32 | 9.99 | 2.89 |
| 4 | 3 | 73.42 | 0.46 | 22.94 | 3.18 |
| 5 | 5 | 89.50 | 0.14 | 6.96 | 3.40 |

EXAMPLE 3

Following essentially the same procedure as in Example 1, except that the air had a higher relative humidity (about 42% at 25° C.) and is heated to about 150° C., four urea treated samples (prepared as in Example 1) are compared with a sample of sodium tripolyphosphate hexahydrate without urea. The samples are dehydrated as in Example 1. Results of ion exchange chromatography analysis of the samples are given in Table III.

TABLE III

| Sample | Urea Content (weight percent) | Phosphate Analysis After Drying | | | |
|---|---|---|---|---|---|
| | | Tripoly-phosphate | Trimeta-phosphate | Pyro-phosphate | Ortho-phosphate |
| 1 | 0 | 54.94 | 0.64 | 39.80 | 4.62 |
| 2 | 1 | 91.71 | 0.34 | 5.61 | 2.34 |
| 3 | 2 | 93.59 | 0.57 | 3.68 | 2.16 |
| 4 | 3 | 93.07 | 0.39 | 4.29 | 2.25 |
| 5 | 5 | 93.59 | 0.29 | 3.78 | 2.34 |

EXAMPLE 4

Following essentially the same procedure as in Example 3, except that the air is heated to about 128° C., four urea treated samples (prepared as in Example 1) are compared with a sample of sodium tripolyphosphate hexahydrate without urea. Dehydration is conducted as in Example 1. Results of ion exchange chromatography analysis of the samples are given in Table IV.

TABLE IV

| Sample | Urea Content (weight percent) | Phosphate Analysis After Drying | | | |
|---|---|---|---|---|---|
| | | Tripoly-phosphate | Trimeta-phosphate | Pyro-phosphate | Ortho-phosphate |
| 1 | 0 | 17.21 | 0.19 | 70.30 | 12.30 |
| 2 | 1 | 77.39 | 0.14 | 17.67 | 4.80 |
| 3 | 2 | 89.30 | 0.19 | 7.60 | 2.91 |
| 4 | 3 | 89.61 | 0.31 | 6.98 | 3.10 |
| 5 | 5 | 92.53 | 0.18 | 4.76 | 2.53 |

EXAMPLE 5

Following essentially the same procedure as in Example 4, except that the air has a higher relative humidity (about 52% at 25° C.) and is heated to 150° C., four urea treated samples (prepared as in Example 1) are compared with a sample of sodium tripolyphosphate hexahydrate without urea. All water was removed by drying as in Example 1. Results of ion exchange chromatography analysis of the samples are given in Table V.

TABLE V

| Sample | Urea Content (weight percent) | Phosphate Analysis After Drying | | | |
|---|---|---|---|---|---|
| | | Tripoly-phosphate | Trimeta-phosphate | Pyro-phosphate | Ortho-phosphate |
| 1 | 0 | 81.28 | 0.14 | 15.80 | 2.78 |
| 2 | 1 | 92.10 | 0.05 | 5.23 | 2.62 |
| 3 | 2 | 93.52 | 0.05 | 4.19 | 2.24 |
| 4 | 3 | 94.80 | 0.19 | 3.31 | 1.70 |
| 5 | 5 | 95.56 | 0.16 | 2.59 | 1.89 |

EXAMPLE 6

Following essentially the same procedure as in Example 1, except that the air is heated to 125° C., four urea treated samples (prepared as in Example 1) are compared with a sample of sodium tripolyphosphate hexahydrate without urea. All water was removed by drying as in Example 1. Results of ion exchange chromatography analysis of the samples are given in Table VI.

TABLE VI

| Sample | Urea Content (weight percent) | Phosphate Analysis After Drying | | | |
|---|---|---|---|---|---|
| | | Tripoly-phosphate | Trimeta-phosphate | Pyro-phosphate | Ortho-phosphate |
| 1 | 0 | 17.27 | 0.09 | 69.45 | 13.19 |
| 2 | 1 | 90.61 | 0.29 | 6.76 | 2.34 |
| 3 | 2 | 91.77 | 0.13 | 5.71 | 2.39 |
| 4 | 3 | 93.51 | 0.22 | 4.21 | 2.06 |
| 5 | 5 | 94.04 | 0.13 | 3.89 | 1.94 |

EXAMPLE 7

Following essentially the same procedure as in Example 6 except that the air is heated to 110° C., four urea treated samples (prepared as in Example 1) are compared with a sample of sodium tripolyphosphate hexahydrate without urea. Dehydration is conducted as in Example 1. Results of ion exchange chromatography analysis of the samples are given in Table VII.

TABLE VII

| Sample | Urea Content (weight percent) | Phosphate Analysis After Drying | | | |
|---|---|---|---|---|---|
| | | Tripoly-phosphate | Trimeta-phosphate | Pyro-phosphate | Ortho-phosphate |
| 1 | 0 | 6.27 | 0.14 | 69.85 | 23.74 |
| 2 | 1 | 70.36 | 0.11 | 21.41 | 8.12 |
| 3 | 2 | 84.37 | 0.10 | 11.41 | 4.12 |
| 4 | 3 | 91.55 | 0.07 | 5.58 | 2.80 |
| 5 | 5 | 92.18 | 0.04 | 5.37 | 2.41 |

The foregoing Examples 1 through 7 illustrate the effectiveness of this invention over a wide range of conditions. In each case the degradation of the sodium tripolyphosphate hexahydrate during dehydration is effectively reduced by the presence of the degradation inhibitor.

EXAMPLE 8

Six samples of sodium tripolyphosphate hexahydrate are treated with 2% by weight of the hexahydrate of various degradation inhibitors in the same manner as in Example 1. These samples are compared with an untreated sample of sodium tripolyphosphate hexahydrate by air drying for 15 hours at 125° C. as in Example 1 except the air was at 52% relative humidity at 25° C. The samples are completely dehydrated as determined by weight loss of the samples. The samples are analyzed using ion exchange chromatography. Results of analysis are shown in Table VIII.

TABLE VIII

| Sample | Degradation Inhibitor | Percent Tripoly-phosphate | Percent Pyro-phosphate | Percent Ortho-phosphate |
|---|---|---|---|---|
| 1 | None | 17.3 | 69.5 | 13.2 |
| 2 | Urea | 91.8 | 5.7 | 2.4 |
| 3 | Guanidine | 72.9 | 15.0 | 12.1 |
| 4 | Dicyandiamine | 29.3 | 40.0 | 30.7 |
| 5 | Ethylene urea (2-imidazolidone) | 47.9 | 32.7 | 19.8 |
| 6 | Biurea | 20.5 | 42.0 | 37.5 |
| 7 | Thiourea | 24.0 | 44.6 | 31.4 |

As can be seen from the above data the degradation inhibtors function to reduce the degradation significantly. Although urea is preferred, guanidine and ethylene urea both function well under the above conditions while others prevented a significant amount of degradation. By using other methods of application to insure a more uniform distribution of the degradation inhibitors the performance of dicyandiamine, biurea, and thiourea is improved.

EXAMPLE 9

About 1,000 parts of anhydrous sodium tripolyphosphate with a tripolyphosphate content of 90.41% is charged into a rotary drum. About 10 parts of water are uniformly sprayed over the rotating bed thereby partially hydrating the sodium tripolyphosphate.

In a similar manner, about 1,000 parts of identical anhydrous sodium tripolyphosphate is partially hydrated with about 20 parts of a 50% by weight aqueous urea solution.

Samples of the partially hydrated material hydrated by water and by the urea solution are dried at about 120° C. and about 160° C. with air heated to that temperature. These samples are compared with samples of 90.41% assay anhydrous sodium tripolyphosphate which is subjected to equal quantities of air also heated to 120° C. and 160° C. Degradation on all samples is determined by measuring pH of a 1% solution and using ion exchange chromatography. Results of these analyses are given in Table IX.

TABLE IX

| Sample | Treatment | Drying Temperature | pH change | Change in Assay, Percent Tripoly-phosphate |
|---|---|---|---|---|
| 1 | Anhydrous | 120 | −.02 | −0.25 |
| 2 | do | 160 | +.03 | −0.35 |
| 3 | 2% aqueous urea | 120 | .07 | −0.87 |
| 4 | do | 160 | 0.0 | +2.08 |
| 5 | 1% water | 120 | −.17 | −1.59 |
| 6 | do | 160 | −.32 | −2.14 |

As can be seen from the above analyses the degradation inhibitor decreased the degradation which occurred in the samples of partially hydrated sodium tripolyphosphate. In fact, at 160° C. not only is degradation prevented, but also some of the orthophosphate and pyrophosphate is converted to tripolyphosphate.

EXAMPLE 10

About 1,000 parts of anhydrous sodium tripolyphosphate, about 50 parts of urea and 25 parts of calcium chloride are mixed in a blender and heated with agitation to about 135° C. and then cooled to about 70° C. About 1,000 parts of anhydrous sodium tripolyphosphate is also heated to 135° C. with agitation and then cooled to about 70° C.

Two detergent slurry formulations are prepared using the following components:

| Component: | Parts |
|---|---|
| Sodium alkylbenzene sulfonate | 203.5 |
| Sodium toluene sulfonate | 18.0 |
| Lauric isopropanolamide | 17.0 |
| Sodium tripolyphosphate | 474.0 |
| Sodium sulfate | 131.9 |
| Sodium silicate | 61.0 |
| Sodium carboxymethylcellulose | 5.0 |
| Water | 88.0 |

In one detergent formulation the urea-treated anhydrous sodium tripolyphosphate is used and in the other the untreated sodium tripolyphosphate is used.

The slurries are heat dried at 130° C. In the detergent formulation containing untreated sodium tripolyphosphate, the assay of the tripolyphosphate dropped about 24% after heat drying. In the detergent formulation containing sodium tripolyphosphate to which urea had been added as a degradation inhibitor the degradation was significantly less with only a 15% drop in assay. Improved results are achieved when larger amounts of degradation inhibitors are used.

What is claimed is:
1. A process for producing anhydrous sodium tripolyphosphate from sodium tripolyphosphate hexahydrate which comprises dehydrating sodium tripolyphosphate hexahydrate in the presence of an effective amount of a nitrogenous degradation inhibitor selected from the group consisting of cyclic nitrogenous compounds represented by the formula

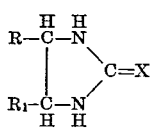

acyclic nitrogenous compounds represented by the formula

and mixtures thereof, wherein R, $R_1$ and $R_4$ are each selected from the group consisting of hydrogen and lower alkyl.

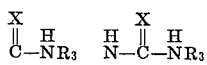

and X is selected from the group consisting of oxygen, sulfur and NH, and $R_3$ is selected from the group consisting of hydrogen and lower alkyl.

2. A process according to claim 1 wherein the degradation inhibitor is a cyclic nitrogenous compound represented by the formula

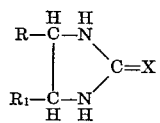

wherein R and $R_1$ are each selected from the group consisting of hydrogen, lower alkyl,

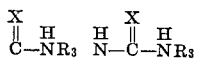

and X is selected from the group consisting of oxygen, sulfur and NH, and $R_3$ is selected from the group consisting of hydrogen and lower alkyl.

3. A process according to claim 2 wherein $R_3$ is hydrogen.

4. A process according to claim 2 wherein X is oxygen.

5. A process according to claim 2 wherein the degradation inhibitor is ethylene urea.

6. A process according to claim 1 wherein the degradation inhibitor is an acyclic nitrogenous compound represented by the formula

wherein $R_4$ is selected from the group consisting of hydrogen, lower alkyl,

and

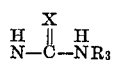

and X is selected from the group consisting of oxygen, sulfur and NH, and $R_3$ is selected from the group consisting of hydrogen and lower alkyl.

7. A process according to claim 6 wherein $R_3$ is hydrogen.

8. A process according to claim 6 wherein X is oxygen.

9. A process according to claim 6 wherein X is NH and $R_3$ is hydrogen.

10. A process according to claim 6 wherein said dehydration is carried out in the presence of surface active agents selected from the group consisting of alkyl aryl sulfonates, alkane sulfates, sulfated oxyethylated phenols, polyoxyalkylene glycol ethers and esters, polyoxyalkylene alkyl phenol, polyoxyalkylene thiophenols, polyoxyalkylene amides, and amido alkane sulfonates and mixtures thereof.

11. A process according to claim 6 wherein said dehydration is carried out by mechanical compaction of a partially hydrated sodium tripolyphosphate.

12. A process according to claim 6 wherein the said degradation inhibitor is present in amounts of at least about 0.5% by weight based on the weight of said sodium tripolyphosphate hexahydrate.

13. A process according to claim 12 wherein said degradation inhibitor is urea.

14. A process according to claim 12 wherein said degradation inhibitor is guanidine.

15. A process according to claim 13 wherein said degradation inhibitor is present in amounts from about 1% to about 8% by weight of said sodium tripolyphosphate hexahydrate and the dehydration temperature is from about 100° C. to about 175° C.

No references cited.

OSCAR R. VERTIZ, *Primary Examiner.*

L. A. MARSH, *Assistant Examiner.*